(12) United States Patent
Boyes

(10) Patent No.: US 10,018,295 B2
(45) Date of Patent: Jul. 10, 2018

(54) BORING DEVICE

(71) Applicant: THOMAS DUDLEY LIMITED, Dudley West Midlands (GB)

(72) Inventor: Simon Boyes, Dudley (GB)

(73) Assignee: Thomas Dudley Limited, Dudley West Midlands (GB)

( * ) Notice: Subject to any disclaimer, the term of this patent is extended or adjusted under 35 U.S.C. 154(b) by 0 days.

(21) Appl. No.: 15/528,945

(22) PCT Filed: Nov. 23, 2015

(86) PCT No.: PCT/GB2015/053563
§ 371 (c)(1),
(2) Date: May 23, 2017

(87) PCT Pub. No.: WO2016/083786
PCT Pub. Date: Jun. 2, 2016

(65) Prior Publication Data
US 2017/0261143 A1    Sep. 14, 2017

(30) Foreign Application Priority Data

Nov. 24, 2014 (GB) .................................. 1420865.6

(51) Int. Cl.
*F16L 41/06* (2006.01)
*F16L 41/12* (2006.01)
*F16L 47/34* (2006.01)

(52) U.S. Cl.
CPC ............... *F16L 41/06* (2013.01); *F16L 41/12* (2013.01); *F16L 47/345* (2013.01); *Y10T 137/6123* (2015.04)

(58) Field of Classification Search
CPC ......... F16L 41/06; F16L 41/12; F16L 47/345; Y10T 137/6123
See application file for complete search history.

(56) References Cited

U.S. PATENT DOCUMENTS 3,622,184 A * 11/1971 Deasy .................... F16L 41/06
                                                   285/148.26
3,792,879 A *  2/1974 Dunmire ............... F16L 41/002
                                                   137/318
(Continued)

FOREIGN PATENT DOCUMENTS

DE      2063463 A1    7/1971
EP      2280210 A1    2/2011

*Primary Examiner* — Craig Schneider
*Assistant Examiner* — Kevin Barss
(74) *Attorney, Agent, or Firm* — Robert L. Stearns; Dickinson Wright, PLLC

(57) ABSTRACT

A pipe boring device (1) including a housing (2) for receiving a self-tapping ferrule insert and a strap (3, 4) for securement around a pipe (10) to enable a hole to be bored into the pipe (10) by the ferrule insert. The strap (3, 4) includes first and second strap portions (3, 4) pivotally secured at a first of their ends (30, 40) by a connector (5). The first strap portion (3) includes a pair of slots (35a, 35b) along its length, which terminate at a second end (34) of the first strap portion (3) to form slot ends (36a, 36b). The second strap portion (4) includes three pairs of hooks (45a, 45b, 46a, 46b, 47a, 47b) along its length, which are receivable within the slots (35a, 35b) and configured to engage the slot ends (36a, 36b). The strap (3, 4) is configured to be wrapped around a pipe (10) with the first strap portion (3) overlapping the second strap portion (4) such that the second strap portion (4) is between the first strap portion (3) and the pipe (10) and one of the hook pairs (45a and 45b, 46a and 46b, 47a and 47b) is in engagement with the slot ends (36a, 36b). Each hook pair (45a and 45b, 46a and 46b, 47a and 47b) is spaced one from the next along the length of the second strap portion (4) such that the strap (3, 4) defines an opening for receiving the pipe (10) that is dependent upon which of the hook pairs (45a and 45b, 46a and 46b, 47a and 47b) is in engagement with the slot ends (36a, 36b).

20 Claims, 3 Drawing Sheets

(56) References Cited

U.S. PATENT DOCUMENTS

| | | | | |
|---|---|---|---|---|
| 4,789,189 A | * | 12/1988 | Robertson | F16L 41/06 285/197 |
| 5,360,241 A | * | 11/1994 | Gundy | F16L 41/12 285/197 |
| 5,695,972 A | | 12/1997 | King | |
| 5,906,048 A | * | 5/1999 | Bender | F16L 41/06 137/318 |
| 8,439,060 B1 | | 5/2013 | Jackson | |
| 2009/0091127 A1 | | 4/2009 | King, Jr. | |

* cited by examiner

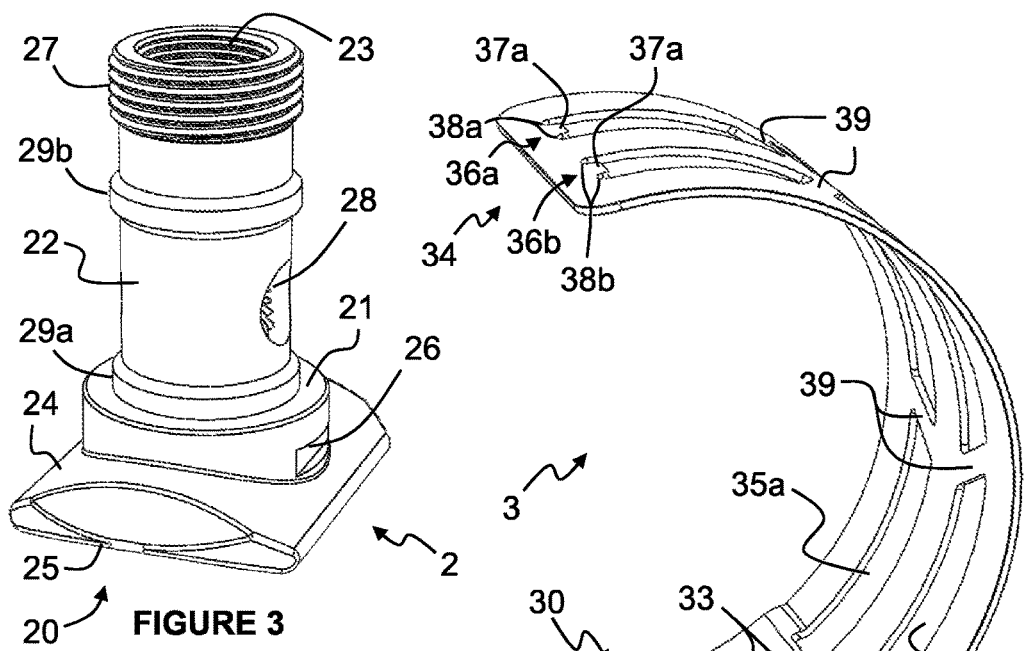
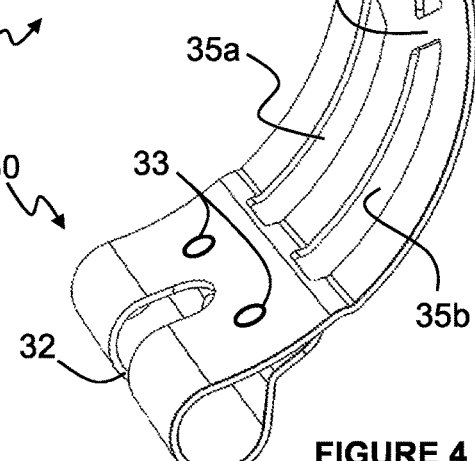
FIGURE 3
FIGURE 4
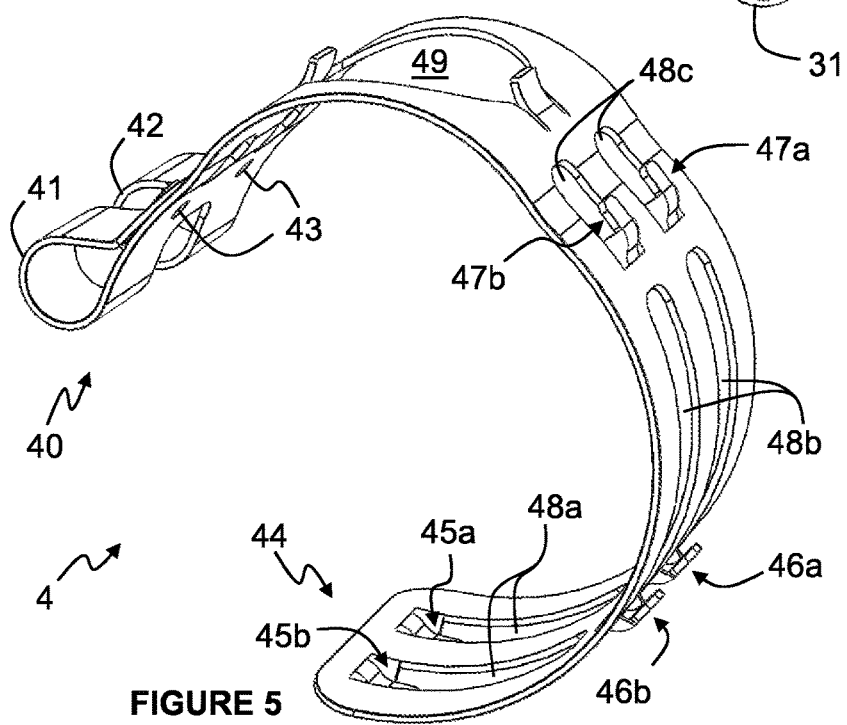
FIGURE 5

BORING DEVICE

BACKROUND

1. Technical Field

This invention relates generally to boring devices and more particularly to boring devices for boring into pipes. More specifically, although not exclusively, this invention relates to pipe straps incorporating self-tapping ferrules for making a fluid connection through the wall of a pipe.

2. Related Art

Self-tapping ferrule straps are generally formed of cast gunmetal and sized to suit a particular pipe diameter. These straps are formed in two, part-circular castings that are wrapped around opposite sides of the pipe and bolted together. Whilst such arrangements are fit for purpose, they are bulky, expensive to manufacture and provide minimal adjustment.

Adjustable self-tapping ferrule straps are also known, which consist of a single casting to which a steel strap is secured at one side. The strap has a portion near its free end having spaced holes for selective engagement with a fastener on the other side of the casting. This arrangement can accommodate a wide array of pipe sizes, but the free end of the strap can present a safety hazard.

SUMMARY

There is therefore a need for a pipe strap that is light, cost effective to manufacture and flexible, whilst addressing one or more issues associated with prior devices.

It is therefore a first non-exclusive object of the invention to provide a boring device that overcomes or at least mitigates one or more of the aforementioned and/or other issues associated with prior art designs. It is a more specific non-exclusive object of the invention to provide an adjustable self-tapping ferrule strap which is able to accommodate multiple pipe sizes and configurations. It is a further, more general non-exclusive object of the invention to provide an improved boring device.

Accordingly, a first aspect of the invention provides a boring device, e.g. a pipe boring device, comprising a boring means and a strap for securement around a pipe to enable a hole to be bored into the pipe, the strap comprising a first strap portion with a first engaging feature, e.g. at or adjacent a free end thereof and/or spaced from the end, and a second strap portion with a second engaging feature, wherein the strap is configured to be wrapped, in use, around a pipe with the first strap portion overlapping or overlying the second strap portion, e.g. such that the second strap portion is between the first strap portion and the pipe, and the second engaging feature is in engagement with the first engaging feature.

By configuring the strap with portions that overlie one another, adjustability can be provided without the free end of the strap being exposed, which would be unsightly and/or could result in a safety hazard.

The extent of overlapping of the strap portions may be varied or variable and/or may comprise an overlapping part of one or each of the respective strap portions. For example, the strap may be configured to be wrapped, in use, around a pipe with part of first strap portion overlapping or overlying part of the second strap portion, e.g. such that the overlapped part of the second strap portion is between the overlapping part of the first strap portion. Preferably, the second engaging feature is located or positioned or included or incorporated on or in or within the overlapped part of the second strap portion.

The first and second engaging features are preferably, but need not be, releasably engaged together, e.g. in use. The second strap portion may comprise one or more, e.g. two or more, second engaging features, which may be along its length, e.g. spaced along its length.

At least one of the second engaging features may be located at or on or in the overlapped part of the second strap portion. Additionally or alternatively, at least one of the second engaging features may extend, e.g. in use, through the first strap portion, for example when the first and second strap portions are in the overlapping or overlying condition.

The strap may comprise or define a length or size or opening or diameter that is at least partially dependent upon which of two or more second engaging features is in engagement with the first engagement feature. The strap may comprise a first length, e.g. circumferential length, or size or opening or diameter when the one second engaging feature is in engagement with the first engaging feature and/or a second length or size or opening or diameter when another second engaging feature is in engagement with the first engaging feature.

Similarly or alternatively, the second engaging feature to be engaged with the first engaging feature may be at least partially dependent upon the diameter of a pipe around which the strap is to be wrapped. The strap may be configured such that the one second engaging feature is in engagement with the first engaging feature when the strap is wrapped around a pipe having a first diameter and/or configured such that another second engaging feature is in engagement with the first engaging feature when the strap is wrapped around a pipe having a first diameter.

The engaging features preferably comprise one or more projections received or receivable within one or more recesses or depressions or openings or apertures or slots and/or engaged or engageable with a portion or edge or end of the strap or of at least one of the one or more recesses or depressions or openings or apertures or slots. The portion or edge or end may comprise a portion of the strap surrounding the recess or depression or opening or aperture or slot. In some embodiments, one of the strap portions e.g. the first, but preferably the second strap portion, comprises the one or more projections and/or the other of the strap portions e.g. the second, but preferably the first strap portion, comprises the one or more recesses or depressions or openings or apertures or slots.

The slot may extend along at least a portion of the length of one of the strap portions, for example within which at least one of the projections of the other strap portion may be received or receivable, e.g. in use. The slot may comprise or define an end or edge, which may comprise an end edge, against which or with which one of the projections may abut and/or engage. In some embodiments, the slot terminates with an end that at least partially defines or comprises the or an edge, which may be at or adjacent the free end of the first strap portion, e.g. spaced from the end. The device or strap portion or slot may comprise a protuberance, e.g. at the end thereof, which may extend inwardly and/or from the end of the slot and/or may at least partially define the or an edge or a pair of recesses, for example engaging recesses, or edges, e.g. within and/or against which or with which one of the projections may abut and/or engage. In some embodiments, each of a pair of engaging recesses or edges is at least partially defined by and/or between the protuberance and/or the slot end and/or a longitudinal edge of the slot.

One or more or each of the projections may comprise a hook, which may be engageable with the end or edge or edges or recesses of the slot. In some embodiments, each of the projections of the second strap comprises a hook that is engageable or configured to engage, in use, the end or edge or edges of the slot of the first strap portion. The hook or hooks may comprise first and second hooks, e.g. the first of which may be located at or adjacent a free end of the second strap portion and/or may be located closer to the or a free end of the second strap portion than the second hook. The first hook may be receivable, in use, within the or a slot of the first strap portion, for example when the second hook is in engagement with the end or edge or edges of the slot. Similarly, the hook or hooks may comprise a third hook, for example wherein the second hook may be located closer to the free end of the second strap portion than the third hook. The first and second hooks may be receivable, in use, within the or a slot of the first strap portion, for example when the third hook is in engagement with the end or edge or edges of the slot.

At least one of the strap portions may comprise or be formed from a sheet material, for example a sheet metal such as steel or aluminium or titanium or any other suitable material. At least one of the hooks may be formed from, or comprise a deformed portion of, the strap or strap portion or sheet material. At least one of the one or more recesses or depressions or openings or apertures or slots may be formed in or cut or punched from the strap or strap portion or sheet material.

At least one of the hooks may comprise a first or end portion that may comprise or incorporate the free end and/or a second or transition portion that may be connected to or integral with the strap or strap portion or sheet material. The first or end portion may comprise a projection or tab, which may extend from the second or transition portion. The second or transition portion may comprise a depression and/or a scoop or scoop shape and/or may be bound by three sides, which may be connected to or formed integrally with the strap or strap portion or sheet material. The second or transition portion may comprise a curved or fillet portion or surface connected to or integral with the strap or strap portion or sheet material along one or more edges, e.g. a first edge, which may be opposite the free end of the hook, and/or a second and/or third edge, each of which may extend along the hook or a length thereof and/or extend substantially orthogonal or perpendicular to the first edge. In some embodiments, the second or transition portion is bound by three sides or walls, each of which may join a respective one of the first, second and third edges of the transition portion to the strap or strap portion or sheet material, and/or the first or end portion may extend from a fourth side or wall of the second or transition portion. The protuberance may be received or receivable within the second or transition portion, for example wherein the fourth side of the second or transition portion abuts and/or engages the pair of edges.

In preferred embodiments, each hook comprises a scoop shaped transition portion, preferably bound by three side walls, and a tab, e.g. extending from the open side of the transition portion. The open side of the transition portion may comprises a pair of edges, e.g. corresponding to end edges of two of the side walls. The pair of edges may be configured to abut, in use, the slot end. The first strap portion may comprise a protuberance, e.g. extending from the end of the slot and/or receivable within the transition portion. The device may comprise an engaging recess, which may be defined between each longitudinal edge of the slot and the protuberance. Each edge of the transition portion may be received, e.g. in use, within a respective one of the engaging recesses, such as to engage the hook with the slot end.

The first strap portion may comprise two or more engaging features that may be spaced laterally at or adjacent its free end. Additionally or alternatively, the second strap portion may comprise two or more engaging features or sets of engaging features, which may be spaced laterally, for example at one or more positions, e.g. along its length. Each set of engaging features may be configured to engage, in use, with the two or more laterally spaced engaging features of the first strap portion.

Preferably, the first engaging feature comprises a slot with an end edge and the or each second engaging feature comprises a hook engaged or engageable with the end edge of the slot. More preferably, wherein the first engaging feature or the first strap portion comprises a pair of slots, e.g. each with an end edge, and/or the second engaging feature or features or the second strap portion comprises two or more hook pairs, e.g. each hook pair being spaced along the length of the second strap portion, for example such that the strap defines an opening, which may be at least partially dependent upon which of the hook pairs is in engagement, e.g. in use, with the end edges of the slot pair.

The first strap portion may comprise a brace between its free end and the edge of the slot, which brace may engage, in use, a hook, e.g. in engagement with the edge of the slot. The brace may comprises a bracing strap that may project from and/or extend across the first strap portion, e.g. to inhibit a free end of the hook from moving away from the first and/or second strap portion.

The strap portions may be connected together, e.g. pivotally connected together, for example at one of their ends, e.g. by a connection or connection means that may be pivotable. The device or connection means or connection may comprise an adjustment means or be adjustable, e.g. for adjusting the relative position of the connected ends the first and second strap portions. The connection may comprise a screw threaded adjustment means and/or configured for selectively drawing the strap portion ends together. In some embodiments, the connection comprises a fastener that may be pivotally connected to at least one of the strap portions, e.g. so as to permit the free ends of the strap portions to be separated from one another. The fastener may be tightened to a predetermined torque, e.g. a torque of at least 8 Nm, such as between 8 and 30 Nm, for example between 10 and 20 Nm, e.g. about 12 Nm.

Each strap portion may comprise a loop at or adjacent the connected end, which may comprise a circumferential slot. Each loop may receive a pin, which may be rotatable therein and/or may comprise a hole that may be aligned with the circumferential slot. At least one of the holes may receive a fastener therein, for example wherein at least one, preferably only one, of the holes comprises a screw thread for engagement with the fastener or a screw thread thereof, e.g. while the other hole may be unthreaded and/or be featureless and/or enable the fastener to be rotated therein. The fastener may be received within the pins such that the unthreaded or featureless hole is adjacent or in abutment with or closer to a head of the fastener, which may comprise an oversized head. The fastener may comprise a stopper, e.g. at its threaded end or the end opposite the head, which stopper may comprise a deformed or crushed portion or a separate element secured or welded thereto.

In preferred embodiments, the connection means comprises a screw threaded fastener engaging a pair of pins, each strap portion comprising a loop at or adjacent its connected end with one of the pins rotatably received therein, each loop comprising circumferential slot through which the fastener extends to enable the strap portions to pivot relative to one another.

One of the strap portions may comprise a receptacle, e.g. which receives the boring means is received and/or retained. The strap portion may include one or more retaining features or elements, such as one or more, e.g. a pair, of retaining elements, such as tabs, which may extend into or inwardly of the receptacle, for example from opposite sides thereof. In some embodiments, the or each retaining feature or element protrudes from the strap and/or engages a notch or recess in or on the boring means, for example to retain it within the receptacle. Optionally, the or each retaining feature or element may extend and/or be deformed or bent or curved away from the strap or strap portion.

The boring means may comprising a housing, e.g. a casting, which housing may comprise the or a or a pair of notches or recesses. The housing may comprise a body or body portion, which may be cylindrical and/or tubular and/or comprise a stem or stem portion, and/or a saddle or saddle portion. The housing or body or body portion and/or saddle or saddle portion may include a bore, e.g. an axial and/or threaded bore. The boring means may be configured to include or house or receive, e.g. within the bore, a self-tapping ferrule insert, which may cooperate with a thread of the bore, e.g. to bore into and/or through a pipe, e.g. in use. The boring device or boring means may comprise a self-tapping ferrule or ferrule insert, for example received within the housing.

In some embodiments, the housing may comprise a shoulder, for example the saddle or saddle portion may be substantially square in plan and/or extend outwardly from the body portion or body, e.g. to provide the shoulder. The shoulder may comprise by a curved upper surface, e.g. for cooperation with the strap or strap portion or an internal surface thereof. The housing or saddle or saddle portion may also comprise a curved bottom surface, e.g. shaped to conform to or approximate the outer surface of a pipe, for example an interim pipe size or a pipe size within, e.g. at the middle of, the range of adjustability of the device or strap. The housing may comprise a sealing means or seal, e.g. for sealing against a pipe in use. The bottom surface may be formed with a circular groove, e.g. surrounding the bore, which groove may receive an O-ring seal. The recess or recesses or notch or notches may be formed in the body or body portion, e.g. adjacent and/or above the saddle or saddle portion. The housing may be formed of metal, e.g. steel or gun metal, or of a plastics material, which preferably comprises an acetal material or other engineering material such as nylon, but may alternatively comprise a different material such as polypropylene or polyethylene.

A further aspect of the invention provides a pipe boring device comprising a housing for receiving a boring means and a strap for securement around a pipe to enable a hole to be bored into the pipe by the boring means, the strap including first and second strap portions connected, e.g. pivotally connected, at a first of their ends, the first strap portion comprising a slot or a pair of slots along its length which terminate(s) at a second end thereof to form slot end(s), the second strap portion comprising two or more, e.g. three, hooks or pairs of hooks along its length which are receivable within the slot(s) and configured to engage the slot end(s), wherein the strap is configured to be wrapped, in use, around a pipe with the first strap portion overlapping the second strap portion such that the second strap portion is between the first strap portion and the pipe and one of the hooks or hook pairs is in engagement with the slot end(s), each hook or hook pair being spaced one from the next along the length of the second strap portion such that the strap defines an opening for receiving the pipe that is dependent upon which of the hooks or hook pairs is in engagement with the slot end(s).

Another aspect of the invention provides a pipe strap for use in a boring device as described above.

Another aspect of the invention provides a kit of parts for assembly into a boring device as described above, the kit comprising the first strap portion, the second strap portion and optionally the boring means.

Yet another aspect of the invention provides a method of boring into a pipe, which may involve using a boring device as described above.

THE DRAWINGS

Embodiments of the invention will now be described by way of example only with reference to the accompanying drawings in which:

FIG. 3 is a perspective view of the housing of the boring device of FIGS. 1 and 2;

FIG. 4 is a perspective view of the outer strap portion of the boring device of FIGS. 1 and 2;

FIG. 5 is a perspective view of the inner strap portion of the boring device of FIGS. 1 and 2;

DETAILED DESCRIPTION

Figure 1:
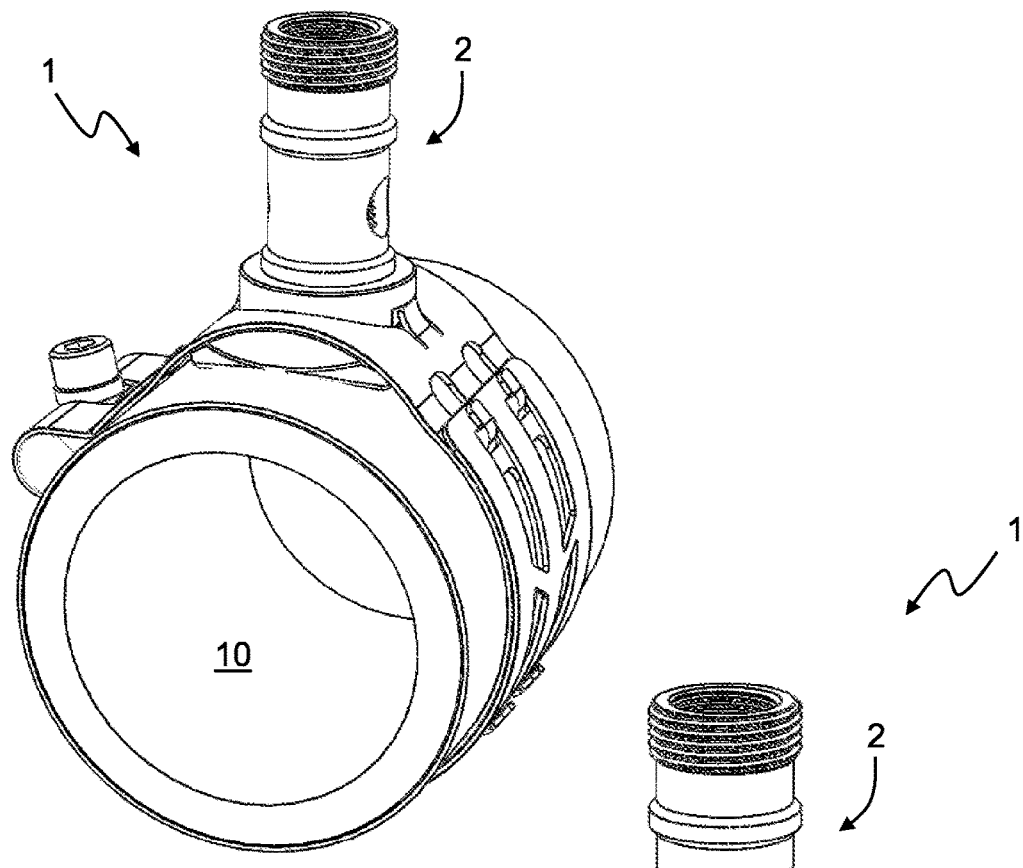
FIG. 1 is a perspective view of a boring device according to an embodiment of the invention, wrapped around and secured to a pipe.
Figure 2:
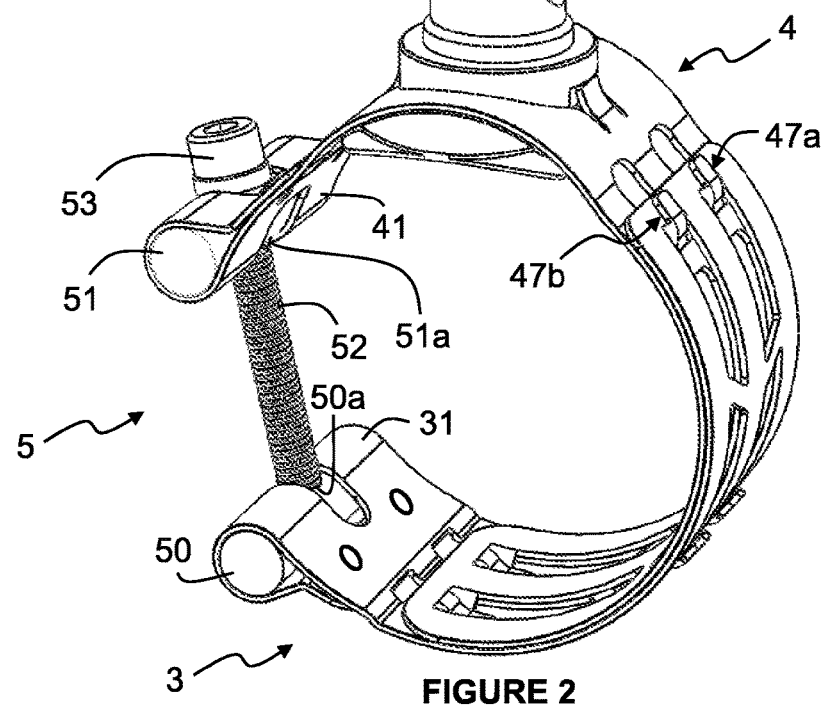
FIG. 2 is a perspective view of the boring device of FIG. 1 with the pipe omitted.

Referring to the FIGS. 1 and 2, there is shown a boring device 1 in the form of a self-tapping ferrule strap embodying aspects of the present invention to be wrapped around a pipe 10. The device 1 includes a housing 2 for receiving a self-tapping ferrule insert (not shown), an outer strap portion 3, an inner strap portion 4 and a connector 5.

As shown more clearly in FIG. 3, the housing 2 includes a saddle portion 20, an intermediate portion 21 and a stem portion 22 with a threaded axial bore 23 extending through all three portions 20, 21, 22. The saddle portion 20 is substantially square in plan, extending outwardly from the intermediate portion to provide a shoulder 24 formed by a curved upper surface 24. The saddle portion 20 also includes a curved bottom surface 25 shaped to conform the outer surface of the pipe 10, which lower surface 25 is formed with a circular groove (not shown) surrounding the bore 23 and receiving an O-ring seal (not shown) for sealing against the pipe 10. In this embodiment, the curved bottom surface 25 has a radius of curvature of 100 mm, which is at the middle of the adjustability of the device 1, but the skilled person will appreciate that any other suitable radius is envisaged without departing from the scope of the invention. The intermediate portion 21 is cylindrical in shape, projects upwardly from the curved upper surface 24 of the saddle portion and includes a pair of notches 26 aligned with each of the thinner edges of each of the saddle portion 20. The stem portion 22 includes an external thread 27 extending along part of its length from its upper end, a transverse or radial bore 28 through a lower part extending through and in communication with the axial bore 23 and radial flanges 29a, 29b, one of which is above and another below the radial bore 28.

The housing 2 receives a self-tapping ferrule insert (not shown) that functions in a similar manner to known design and therefore will not be described further, save that the invention permits the housing 2 and insert (not shown) to be manufactured in a variety of different ways, as it does not form an integral part of either of the strap portions 3, 4 as is the case with conventional self-tapping ferrule straps. Indeed, it is envisaged that one or more critical parts of the boring device may be machined from a superior material, while less critical parts may be manufactured or moulded from different, e.g. more cost-effective, materials. For example, the housing 2 may be formed of a moulded plastics material, with only a cutting insert (not shown) thereof being formed of a stronger material, such as stainless steel.

Turning now to FIG. 4, the outer strap portion 3 in this embodiment is concave with a first end 30 formed into a loop 31 with a circumferential slot 32 at its lateral centre. The loop is formed by an end portion of the strap material wrapped back on itself and secured to the strap material by two clinched portions or rivetless joints 33, which may be replaced by rivets or other like fasteners or welded together, such as tack welded together. The outer strap portion 3 also includes a second end 34 and a pair of elongate slots 35a, 35b extending between the first and second ends 30, 34 with respective slot ends 36a, 36b adjacent the second strap end 34. Each of the slot ends 36a, 36b includes a protuberance 37a, 37b extending inwardly of the slot 35a, 35b inboard of the longitudinal edges thereof to define respective pairs of engaging edges 38a, 38b on either side of each protuberance 37a, 37b. Each of the slots 35a, 35b also includes a pair of skewed reinforcing ribs 39 extending at an angle there-across. The ribs 38 are skewed to ensure that they are not as engaging edges in use.

As shown in FIG. 5, the inner strap portion 4 is also concave with a first end 40 formed into a loop 41 with a circumferential slot 42 at its lateral centre, wherein the strap material is wrapped back on itself and secured to the strap material by a pair of rivets 43 or like fasteners. The inner strap portion 4 includes a second end 44, three spaced pairs of hooks 45a, 45b, 46a, 46b and 47a, 47b with pairs of slots 48a, 48b extending between respective hook pairs 45a, 45b, 46a, 46b and 47a, 47b. The inner strap portion 4 also includes a receptacle 49 for receiving the housing 2 and a pair of slots 48c extending between the last hook pair 47a, 47b and the receptacle 49. A pair of opposed retaining tabs 49a are provided that extend inwardly of the receptacle 49 along the centreline of the inner strap portion 4. The tabs 49a are bent outwardly from the inner strap portion 4 such that they project upwardly.

Figure 6:
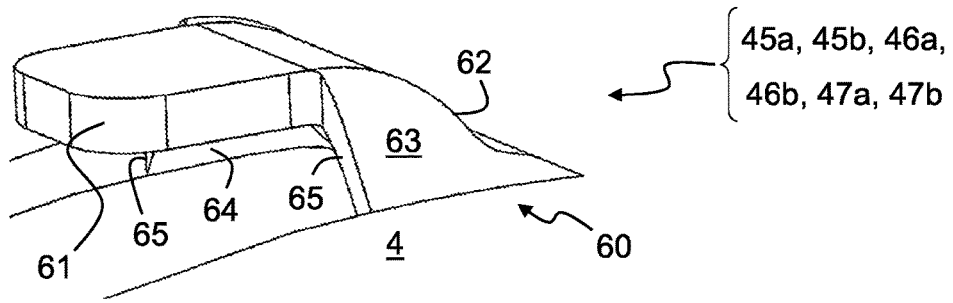
FIG. 6 is a perspective view of one of the hooks of the inner strap portion of FIG. 5.

A first of the hook pairs 45a, 45b is adjacent the second end 44 of the inner strap portion 4, while the other two hook pairs 46a, 46b and 47a, 47b are spaced at positions along the inner strap portion 4 between the first hook pair 45a, 45b and the receptacle 49. Each of the positions are selected to accommodate respective pipe sizes, or more specifically respective pipe size ranges. Each hook 45a, 45b, 46a, 46b, 47a, 47b has substantially the same shape, one of which is shown in FIG. 6, and includes a transition portion 60 from which an engaging tab 61 projects. The transition portion 60 is in the form of a scoop shaped depression pressed from the strap material, open at one end and bound by three walls 62, 63, 64. A first wall 62 is opposite the open end, while second and third walls 63, 64 extend along respective sides of the hook 45a, 45b, 46a, 46b, 47a, 47b, perpendicular to the first wall 62, and terminate at the open end. The engaging tab 61 is substantially rectangular in plan extends from the top of the open end of the transition portion 60 with one of its short edges formed integrally therewith. Each of the second and third walls 63, 64 has a free edge 65 at the open end of the transition portion 60.

Figure 7:
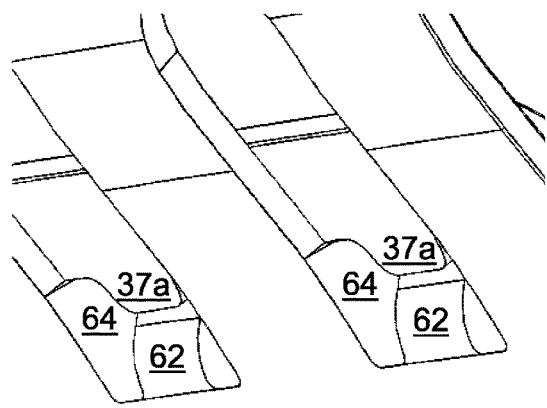
FIG. 7 is a perspective view of from the inside of the boring device of FIGS. 1 and 2 illustrating the engagement between the hooks of the inner strap portion and the slots of the outer strap portion.
Figure 8:
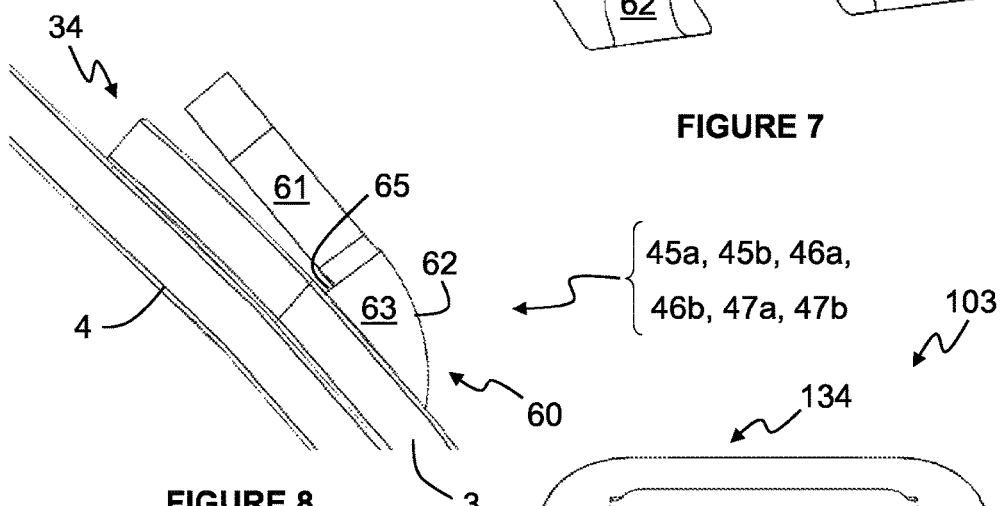
FIG. 8 is a side view of the strap portions of the boring device of FIGS. 1 and 2 illustrating the engagement between the hooks of the inner strap portion and the slots of the outer strap portion.

As shown more clearly in FIGS. 7 and 8, in an engaged condition each of the protuberances 37a, 37b of the slot ends 36a, 36b of the outer strap portion 3 is received within the transition portion 60 of one of the hooks 45a, 45b, 46a, 46b, 47a, 47b. The free edges 65 of each of the second and third walls 63, 64 of the transition portion 60 of the relevant hook 45a, 45b, 46a, 46b, 47a, 47b straddle the protuberances 37a, 37b and abut respective engaging edges 38a, 38b on either side thereof. This arrangement provides a positive lock between the inner and outer strap portions 3, 4 and the skilled person would appreciate that the geometry of the hooks provides a strong resistance to deformation when a separation force is applied along the length of the strap portions 3, 4.

The connector 5 includes first and second pins 50, 51 each being received within a respective one of loops 31, 41 and a threaded fastener 52 in the form of a bolt with a head 53 arranged for engagement with a driving tool (not shown). The first pin 50 has a transverse threaded hole 50a at its axial centre and is received in the loop 31 of the outer strap portion 3 such that the hole 50a is aligned with the slot 32 of the loop. The second pin 51 has a transverse through hole 51a free of threads and is received in the loop 41 of the inner strap portion 4 such that the hole 51a is aligned with the slot 42 of the loop. The fastener 52 is slidingly and rotatably received in the hole 51a of the second pin 51 with the head 53 abutting it with the free end of the fastener 52 threadedly engaging the hole 50a in the first pin.

It will be appreciated that the circumferential slots 32, 42 enable the strap portions 3, 4 to pivot about the connector 5, when the fastener 52 engages the two pins 50, 51. This enables adjustment of the device 1 and enables the strap portions 3, 4 to be separated sufficiently to wrap them around a pipe 10.

The device 1 is provided with the housing 2 received within the receptacle 49 and retained therein by virtue of the retaining tabs 49a, which are received within and engage the notches 26 in the housing 2. A self-tapping ferrule insert (not shown) is received within the housing 2 and the strap portions 3, 4 are connected at their first ends by the connector 5 with their second ends 34, 44 disengaged to enable the device 1 is able to be wrapped around a pipe 10.

In use, the strap portions 3, 4 are wrapped around the pipe 10 such that the outer strap portion 3 is placed over the inner strap portion 4 with the requisite hook pair 45a, 45b, 46a, 46b or 47a, 47b received within the slots 37a, 37b adjacent the slot ends 36a, 36b. Any upstream hook pairs 45a, 45b and/or 46a, 46b are also received within intermediate portions of the slots 37a, 37b. The fastener 52 is then tightened, bringing the relevant hook pair 45a, 45b, 46a, 46b or 47a, 47b, the last hook pair 47a, 47b in the arrangement shown in FIGS. 1 and 2, into engagement with the engaging edges 38a, 38b of the slots 37a, 37b of the outer strap portion 3. The fastener 52 is tightened to a predetermined torque of, for example, between 8 and 30 Nm, preferably between 10 and 20 Nm, for example about 12 Nm to ensure a secure and pre-tensioned connection between the strap portions 3, 4. The user is then able to bore a hole into the pipe 10 using the self-tapping ferrule insert (not shown) in the normal way.

In FIGS. 1 and 2, the device 1 is configured to accommodate the smallest pipe diameter range by engaging the last hook pair 47a, 47b, with both upstream hook pairs 45a, 45b and 46a, 46b received within intermediate portions of the slots 37a, 37b. However, it will be appreciated by the skilled person that a larger pipe diameter range may be accommodated by engaging the second hook pair 46a, 46b with the slot ends 36a, 36b, in which case only the first hook pair 45a, 45b would be received within intermediate portions of the slots 37a, 37b. Similarly, the largest pipe diameter range is accommodated by engaging the first hook pair 45a, 45b with the slot ends 36a, 36b, in which case no other hook pairs 46a, 46b or 47a, 47b would be located in the slots 37a, 37b. In this embodiment, the device 1 is configured to accommodate pipe sizes between 80 mm and 120 mm. However, the skilled person will appreciate that any conceivable range is envisaged without departing from the scope of the invention.

Figure 9:
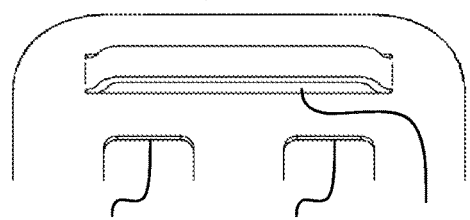
FIG. 9 is a partial top view of the end of an outer strap portion according to an alternative embodiment incorporating a bracing strap.

Turning now to FIG. 9, there is shown the end 134 of an outer strap portion 103 according to an alternative embodiment. The outer strap portion 103 in this embodiment includes a bracing strap 137 and slot ends 136a, 136b that are featureless with a respective single end edge. The bracing strap 137 projects outwardly from and laterally across the outer strap portion 103 adjacent the second end 134 to define a gap 134a between the outer strap portion 3 and an inner surface of the bracing strap 137.

In use, the relevant hook pair 45a, 45b, 46a, 46b or 47a, 47b is received within the gap 134a, effectively pinning them to prevent deformation due to tensile loading of the strap portions 3, 4 as the fastener 52 is tightened further.

Figure 10:
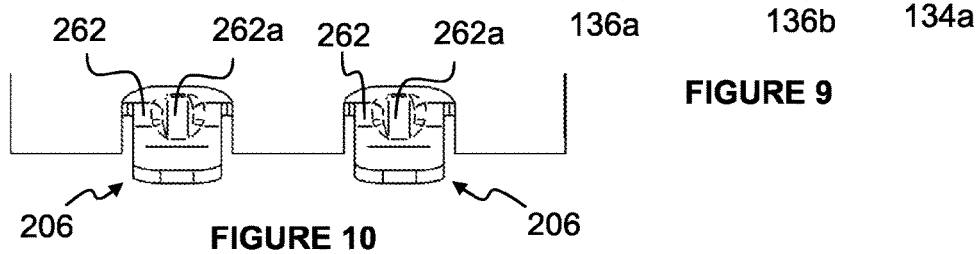
FIG. 10 is a partial front view of a pair of hooks of an inner strap portion according to another alternative embodiment.

FIG. 10 illustrates a pair of hooks 206 according to an alternative embodiment, wherein the second and third walls 63, 64 of the transition portion 60 are omitted, with a dogleg 262 corresponding to the first wall 62. The dogleg 262 in this embodiment incorporates a reinforcing deformation 262a.

It will be appreciated by those skilled in the art that several variations to the aforementioned embodiment are envisaged without departing from the scope of the invention. For example, the outer strap portion 3 may include only one or more than two slots 37a, 37b and/or the inner strap 4 may include a corresponding or, in some arrangements, a different number of hook sets 45a, 45b and 46a, 46b and 47a, 47b. Additionally or alternatively, the number of slots 48a, 48b, 48c extending between and/or from the hooks 45a, 45b, 46a, 46b and 47a, 47b may be modified or such slots 48a, 48b, 48c may be omitted altogether.

Advantageously, one or more elements of at least one of the strap portions 3, 4, for example one or more of the hooks 45a, 45b, 46a, 46b, 47a, 47b may include one or more reinforcing elements, such as ribs that may be formed in the sheet material from which the strap portion 3, 4 is formed. It is also envisaged that at least one of the strap portions 3, 4 may be fabricated from different parts, e.g. welded or fastener together.

It will also be appreciated by those skilled in the art that any number of combinations of the aforementioned features and/or those shown in the appended drawings provide clear advantages over the prior art and are therefore within the scope of the invention described herein.

The invention claimed is:

1. A pipe boring device comprising a strap for securement around a pipe to enable a hole to be bored into the pipe, the strap comprising first and second strap portions connected together at a first of their ends, the first strap portion comprising a slot at or adjacent a free end thereof, the second strap portion comprising two or more hooks spaced along its length, each hook comprising a scoop shaped transition portion bound by three side walls and a tab extending from the open side of the transition portion, the strap being configured to be wrapped, in use, around a pipe with the first strap portion overlapping the second strap portion such that the second strap portion is between the first strap portion and the pipe and one of the hooks is received in the slot and extends through the first strap portion and is in engagement with the end of the slot, wherein the strap defines an opening that is at least partially dependent upon which of the two or more hooks is in engagement with the end of the slot.

2. A boring device according to claim 1, wherein the first strap portion comprises a pair of slots each with an end and the second strap portion comprises two or more hook pairs, each hook pair being spaced along the length of the second strap portion such that the strap defines an opening that is dependent upon which of the hook pairs is in engagement, in use, with the ends of the slot pair.

3. A boring device according to claim 1, wherein the strap portions are formed from sheet material and the or each hook comprises a deformed portion of sheet material.

4. A boring device according to claim 1, wherein the open side of the transition portion comprises a pair of edges corresponding to end edges of two of the side walls, the pair of edges being configured to abut, in use, the slot end.

5. A boring device according to claim 4, wherein the first strap portion comprises a protuberance extending from the end of the slot and receivable within the transition portion.

6. A boring device according to claim 5, wherein an engaging recess is defined between each longitudinal edge of the slot and the protuberance, each edge of the transition portion being received, in use, within a respective one of the engaging recesses to engage the hook with the slot end.

7. A boring device according to claim 1, wherein the strap portions are pivotally connected together by a connection.

8. A boring device according to claim 7, wherein the connection comprises a screw threaded adjustment device for selectively drawing the strap portion ends together.

9. A boring device according to claim 7, wherein the connection comprises a screw threaded fastener engaging a pair of pins, each strap portion comprising a loop at or adjacent its connected end with one of the pins rotatably received therein, each loop comprising circumferential slot through which the fastener extends to enable the strap portions to pivot relative to one another.

10. A boring device according to claim 1, wherein one of the strap portions comprises a receptacle within which a housing is received.

11. A boring device according to claim 10, wherein the strap portion with the receptacle comprises a pair of opposed retaining tabs.

12. A pipe boring device comprising a strap for securement around a pipe to enable a hole to be bored into the pipe, the strap comprising first and second strap portions pivotally connected together at a first of their ends by a connection, the first strap portion comprising a slot at or adjacent a free end thereof, the second strap portion comprising two or more hooks spaced along its length, the strap being configured to be wrapped, in use, around a pipe with the first strap portion overlapping the second strap portion such that the second strap portion is between the first strap portion and the pipe and one of the hooks is received in the slot and extends through the first strap portion and is in engagement with the end of the slot, wherein the strap defines an opening that is at least partially dependent upon which of the two or more hooks is in engagement with the end of the slot.

13. A boring device according to claim 12, wherein the connection comprises a screw threaded adjustment device for selectively drawing the strap portion ends together.

14. A boring device according to claim 12, wherein the connection comprises a screw threaded fastener engaging a pair of pins, each strap portion comprising a loop at or adjacent its connected end with one of the pins rotatably received therein, each loop comprising circumferential slot through which the fastener extends to enable the strap portions to pivot relative to one another.

15. A boring device according to claim 12, wherein the first strap portion comprises a pair of slots each with an end and the second strap portion comprises two or more hook pairs, each hook pair being spaced along the length of the second strap portion such that the strap defines an opening that is dependent upon which of the hook pairs is in engagement, in use, with the ends of the slot pair.

16. A boring device according to claim 12, wherein the strap portions are formed from sheet material and the or each hook comprises a deformed portion of sheet material.

17. A boring device according to claim 12, wherein one of the strap portions comprises a receptacle within which a housing is received.

18. A boring device according to claim 17, wherein the strap portion with the receptacle comprises a pair of opposed retaining tabs that engage respective notches in the housing to retain the housing within the receptacle.

19. A pipe boring device comprising a strap for securement around a pipe to enable a hole to be bored into the pipe, the strap comprising first and second strap portions connected together at a first of their ends, the first strap portion comprising a slot at or adjacent a free end thereof, the second strap portion comprising one or more hooks spaced along its length, the or each hook comprising a scoop shaped transition portion bound by three side walls and a tab extending from the open side of the transition portion, the strap being configured to be wrapped, in use, around a pipe with the first strap portion overlapping the second strap portion such that the second strap portion is between the first strap portion and the pipe and one of the hooks is received in the slot and extends through the first strap portion and is in engagement with the end of the slot, wherein the first and second strap portions are connected together by a connection which is adjustable for selectively drawing the strap portion ends together.

20. A boring device according to claim 19, wherein the strap comprises a receptacle with one or more retaining features and the housing is received within the receptacle and is retained therein by the retaining features.

* * * * *